(12) United States Patent
Huang et al.

(10) Patent No.: US 8,612,291 B2
(45) Date of Patent: Dec. 17, 2013

(54) OPTIMIZED DISPLAY OF AD LANDING PAGE

(75) Inventors: Yun Huang, Mountain View, CA (US); Amit Khanna, Sunnyvale, CA (US); Timothy Lai, Belmont, CA (US)

(73) Assignee: Google Inc., Mountain View, CA (US)

( * ) Notice: Subject to any disclaimer, the term of this patent is extended or adjusted under 35 U.S.C. 154(b) by 2 days.

(21) Appl. No.: 13/102,512

(22) Filed: May 6, 2011

(65) Prior Publication Data
US 2012/0284114 A1    Nov. 8, 2012

(51) Int. Cl.
*G06Q 30/00* (2012.01)
*G05B 19/418* (2006.01)

(52) U.S. Cl.
USPC ............ 705/14.45; 705/14.73; 715/736

(58) Field of Classification Search
USPC .............. 705/14.73, 14.45; 715/736
See application file for complete search history.

(56) References Cited

U.S. PATENT DOCUMENTS

| | | | | |
|---|---|---|---|---|
| 6,742,030 | B1 * | 5/2004 | MacPhail | 709/224 |
| 2007/0250468 | A1 * | 10/2007 | Pieper | 707/1 |
| 2008/0301090 | A1 * | 12/2008 | Sadagopan et al. | 707/3 |
| 2009/0234713 | A1 | 9/2009 | Bi et al. | |
| 2010/0094878 | A1 | 4/2010 | Soroca et al. | |
| 2010/0251128 | A1 | 9/2010 | Cordasco | |
| 2011/0153435 | A1 * | 6/2011 | Pisaris-Henderson | 705/14.73 |

OTHER PUBLICATIONS

"Track Every Click with Crazy Egg's Confetti". Nick Gonzalez. Jun. 18, 2007.*

* cited by examiner

*Primary Examiner* — Victoria Vanderhorst
(74) *Attorney, Agent, or Firm* — Birch, Stewart, Kolasch & Birch, LLP.

(57) ABSTRACT

Methods, systems, and apparatus, including a computer program product for optimizing the display of landing pages in restrictive display environments are provided. A determined area or region of the landing page is identified. Upon receiving a request for content items to be presented on a device, a plurality of content items are identified for presentation on the device, each of the content items having an associated landing page destination address. If the requesting device is a restricted display device, a hash tag is appended to each of the associated destination addresses, each hash tag corresponding to a predefined section of an associated landing page. The plurality of identified content items are transmitted to the requesting device for presentation.

6 Claims, 5 Drawing Sheets

OPTIMIZED DISPLAY OF AD LANDING PAGE

BACKGROUND

This disclosure relates to content presentation, and more particularly to methods and systems for optimizing the display of a landing page associated with served content.

As the availability of mobile devices, such as mobile phones, tablet devices, portable computers, and the like, continues to grow, more and more consumers/users, (herein referred to as users) are utilizing such devices to electronically access content. This in turn increases the need for users to be able to find the content they desire and for content publishers to provide their content to the consumers in multiple formats.

Some content publishers have addressed the growing concerns with content presentation to devices having limited display area, i.e., display restricted environments, by transforming their content pages into mobile-friendly pages and maintaining parallel versions of the content pages. A mobile-friendly version and a version for non restrictive display environments. When the publisher receives a request for content from a mobile device, the publisher provides the mobile-friendly version. However, not all publishers have the time or resources to transform their content pages into mobile-friendly pages.

From an advertising perspective, the same concerns exist for the display of landing pages in display restricted environments, such as mobile devices. Many electronic ads contain links to other electronic content such as web pages, images, video files, audio files and the like. When an ad contains a link to a web page, the linked web page is commonly referred to a the "landing page."

A mobile-device user may be attracted by an ad and click on the ad. But when the user faces a landing page with a bunch of content in small font, they usually don't want to dig into the page on the mobile device. Accordingly, the design of the landing page can have a large influence on whether or not an ad click-through results in a conversion. Poorly designed landing pages and/or landing pages that do not conform to the restraints of the rendering device, such as mobile devices, may not conform to a user's expectations, resulting in the loss of a conversion.

SUMMARY

This specification describes technologies relating to content presentation in general, and specifically methods and systems for optimizing the display of a landing page associated with served content.

In general, one aspect of the subject matter described in this specification can be embodied in a computer implemented method, receiving a request for content items to be presented on a device; identifying a plurality of content items for presentation on the device, each of the content items having an associated landing page destination address; receiving information about the device; if the device information indicates that the device is a restricted display device, appending a hash tag to each of the associated destination addresses, each hash tag corresponding to a predefined section of the associated landing page; and transmitting the plurality of identified content items to the device for presentation.

In another aspect f the subject matter described in this specification can be embodied in a computer implemented method, comprising: providing the content provider with code to be embedded in the landing page; anonymously logging click activity from visitors of the landing page using a combination of the embedded code and first party cookies; mapping the logged click data to sections of the landing page; and providing the content provider a visual representation of the mapping.

These and other embodiments can optionally include one or more of the following features. The predefined section of the associated landing page is defined by the content item provider. The predefined section of the associated landing page is defined based on a popularity map of the associated landing page. The popularity map is generated based on historical click activity from visitors of the associated landing page. The sections of the landing page include named anchors, and the mapping between the logged click data and the sections of the landing page indicates the anchored section corresponding to each location of a visitor's first click. The visual representation is a screenshot of the landing page with a visual indication of the historical click activity in the mapped section. The visual indication of the historical click activity is a graphical representation of the number of visitor clicks received in each anchored section of the landing page.

Particular implementations of the subject matter described in this specification can be implemented to realize one or more of the following advantages. Degrees of implicit local relevance can be determined for queries.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
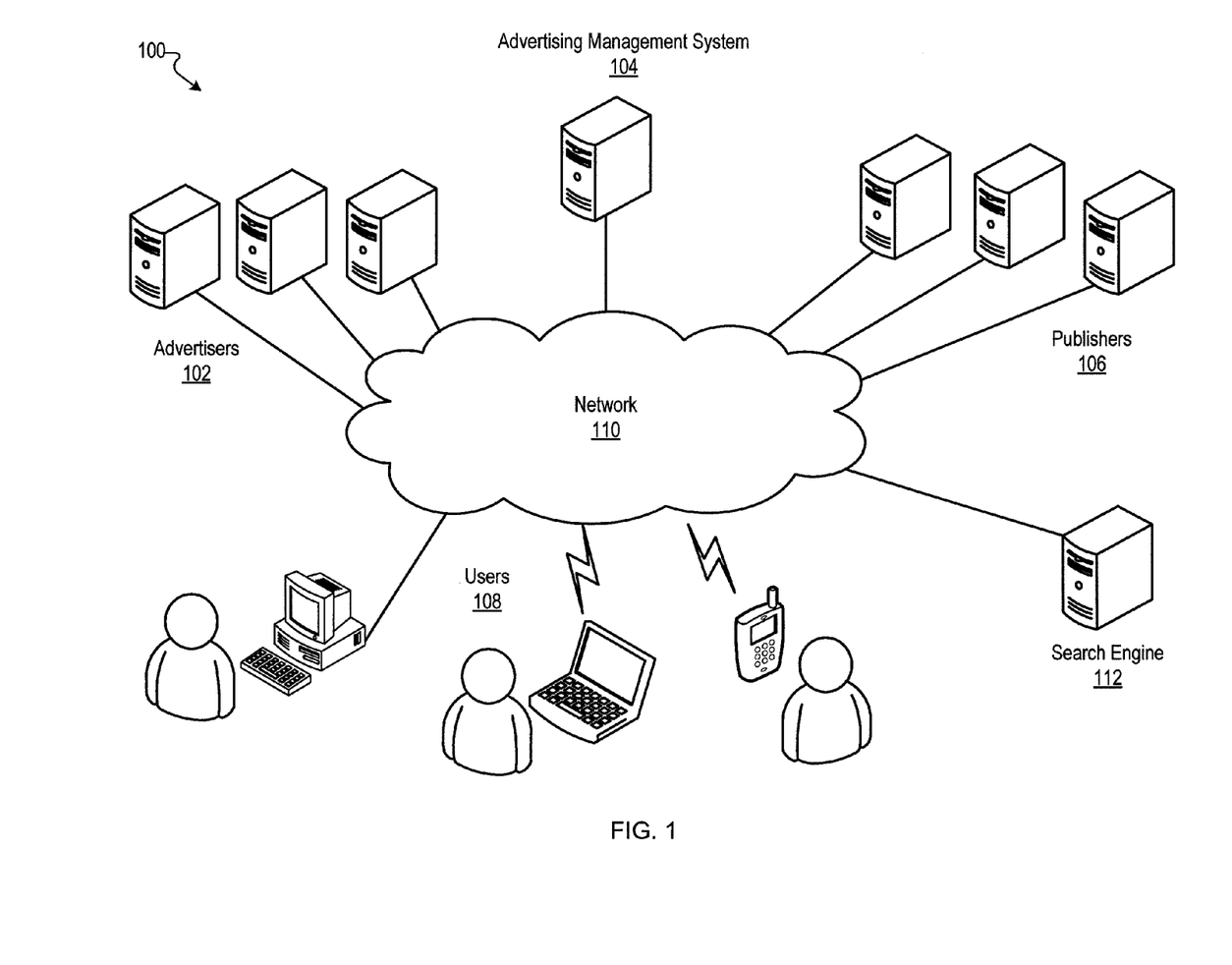
FIG. 1 is a block diagram of an exemplary content presentation system.

FIG. 1 is a block diagram of an exemplary content presentation system 100. The content presentation system can include many thousands of advertisers 102, publishers 106, user devices 108, and a search engine 110. Although reference is made to advertisements, other forms of content including other forms of sponsored content can be provided in the content presentation system 100.

Advertisers 102 can directly, or indirectly, enter, maintain, and log ad information in the advertising management system 104. Though reference is made to advertising, other forms of content, including other forms of sponsored content, can be delivered by the system 104. The ads can be in the form of graphical ads, such as banner ads, text only ads, image ads, barcode ads (i.e., ads including one or more barcodes, for example, for use in redeeming the ads), audio ads, video ads, ads combining one or more of any of such components, and so on. The ads can also include embedded information, such as links, meta-information, and/or machine executable instructions.

One or more publishers 106 can submit requests for ads to the system 104. The advertising management system 104 responds by sending ads to the requesting publisher 106 for placement on, or in association with, one or more of the publisher's properties. Exemplary publisher properties can include web pages, applications, streaming video/audio platforms and the like. Although advertisers 102 and publishers 106 are shown separately in FIG. 1, they can be the same entity, i.e., an advertiser can also be a publisher and vice versa.

Other entities, such as users 108 and advertisers 102, can provide usage information to the advertising management system 104, for example, whether or not a conversion (e.g., a purchase or other interaction) or a click-through related to an ad (e.g., a user has selected an ad) has occurred. This usage information can include measured or observed user behavior related to ads that have been provided for presentation.

A network 110 connects the advertisers 102, the advertising management system 104, the publishers 106, the users 108, and the search service 112. Network 110 can be a local area network (LAN), wide area network (WAN), the Internet, one or more telephony networks, a cloud computing network, or a combination thereof.

An exemplary publisher 106 is a general content server that receives requests for content (e.g., articles, discussion threads, music, video, graphics, search results, web page listings, information feeds, and so on), and retrieves the requested content in response to the request. The content server can submit a request for ads to an advertisement server in the advertising management system 104. The ad request can include the number of ads desired. The ad request can also include content request information. The content request information can include the content itself (e.g., page, video broadcast, radio show, or other type of content), a category corresponding to the content or the content request (e.g., arts, business, computers, arts-movies, arts-music, and so on), part or all of the content request, content age, content type (e.g., text, graphics, video, audio, mixed media, and so on), geo-location information, and so on.

In some implementations, the content server (or a client browser or the like) combines the requested content with one or more of the ads provided by the advertising management system 104. The combined content and ads can be served (e.g., sent) to the users 108 that requested the content for presentation in a viewer (e.g., an application on a mobile device). The content server can transmit information about the ads back to the advertisement server, including information describing how, when and/or where the ads are to be rendered (e.g., in hypertext markup language (HTML) or JavaScript™).

Search service 112 receives queries from a plurality of users 108. In response, the search service 112 retrieves relevant search results from an index of documents (e.g., from an index of web pages) and provides them to the requesting user. The search results identify resources responsive to the submitted query. Exemplary search results can include lists of web page titles, snippets of text extracted from those web pages, and hypertext links to those web pages, and can be grouped into a predetermined number (e.g., ten) of search results.

The search service 112 can submit a request for ads to the advertising management system 104. For example, ads can be requested for presentation along with the search results responsive to a received query. The request can include a number of ads desired. This number can depend on the search results, the amount of screen or page space occupied by the search results, the size and shape of the ads, and so on. The request for ads can also include the query (as entered or parsed), information based on the query (such as geo-location information, whether the query came from an affiliate and an identifier of such an affiliate), and/or information associated with, or based on, the search results.

As noted above, the advertising management system 104 can collect usage information from advertisers 102, publishers 106, and/or users. This usage information can include measured or observed user behavior related to ads that have been served by the management system. A served ad is an ad that has been provided for presentation in response to a request for ad(s). In addition, the advertising management system 104 logs information related to the ads it serves.

Figure 2:
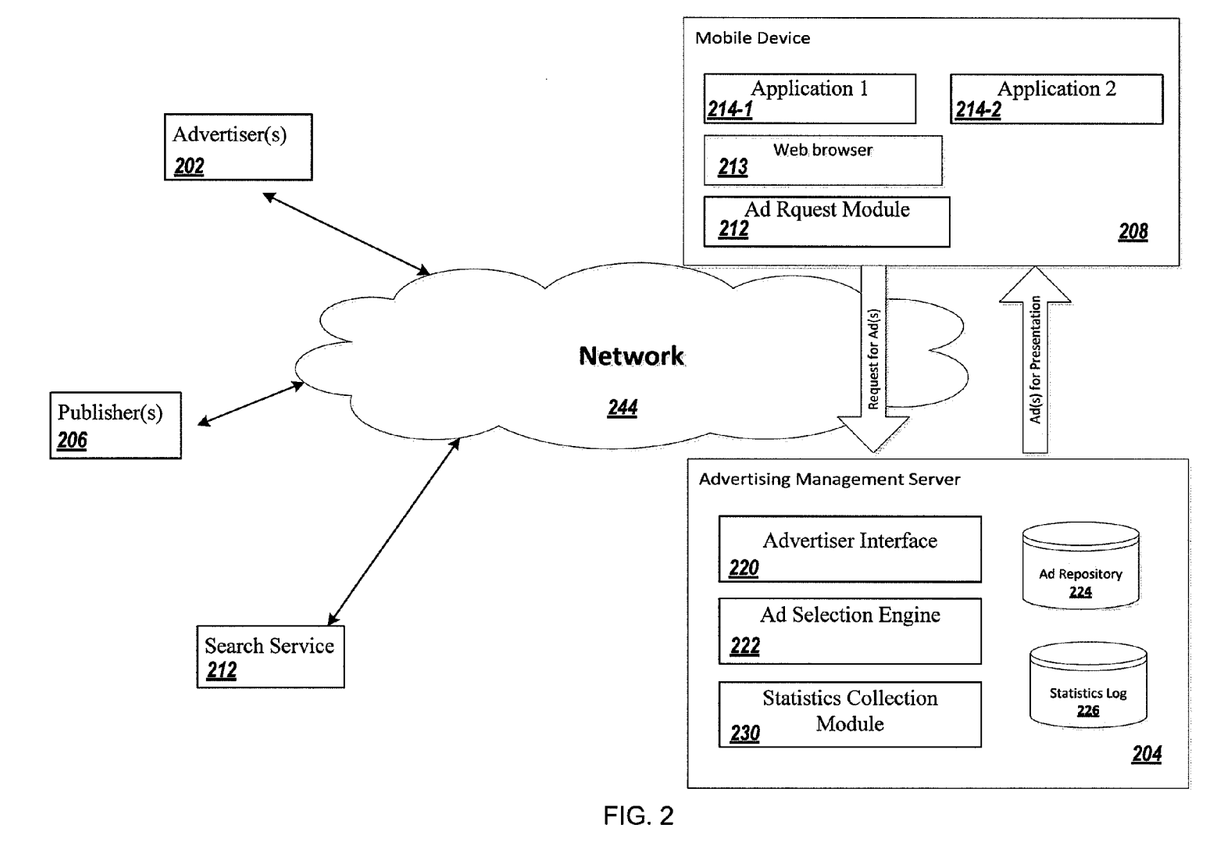
FIG. 2 is a block diagram illustrating an exemplary advertising management system and an exemplary client device.

FIG. 2 is a block diagram of an exemplary advertising management server 204 operable to provide ads for presentation in response to a request for ad(s), for example from a mobile device 208. The mobile device 208 can include an ad request module 212. Although shown separately in FIG. 2, the ad request module 212 may be a part of web browser 216 and/or a part of one or more application(s) 214-1, 214-2 stored on the device.

The ad server 204 includes an advertiser frontend interface 220 for creating advertisements and/or ad campaigns, ad repository 224 for storing ads, ad selection engine 222, statistics collection module 230, statistics log(s) 226, and conversion log(s) 228. The advertiser interface 220, ad selection engine 222, statistics collection module 230, ad repository 224, and statistics log 226 may be part of the advertising management server 204 as illustrated, or provided as independent components in communication with the advertising management server 204 in a manner known in the art. For example, advertising management server 204 may be provided as a distributed computing system.

Advertiser interface 220 provides an interface for advertisers 202 to create and manage ad campaigns. An ad campaign can be a simple of as a single advertisement with associated serving criteria or a plurality of advertisements having related serving criteria. The serving criteria can include one or more parameters, provided by an advertiser or the advertising management system, indicating when, where and/or under what conditions particular ads may be served. Using the advertiser interface 220, an advertiser can create a campaign by providing the content needed to present the different ads and defining the serving criteria for the campaign. For example, the serving criteria parameters can include one or more of the following: one or more keywords or topics, geographic information, a value indication for the advertisement, start date, end date, and the like.

The advertiser interface 220 can include one or more tools to help an advertiser design a campaign and/or individual ad, also referred to as a creative. According to an embodiment, the advertiser interface 220 includes a landing page optimizing tool which can be utilized by an advertiser to set/select a predefined region or section of the landing page to be displayed when a user clicks on the associated creative, e.g., ad.

Figure 3A:
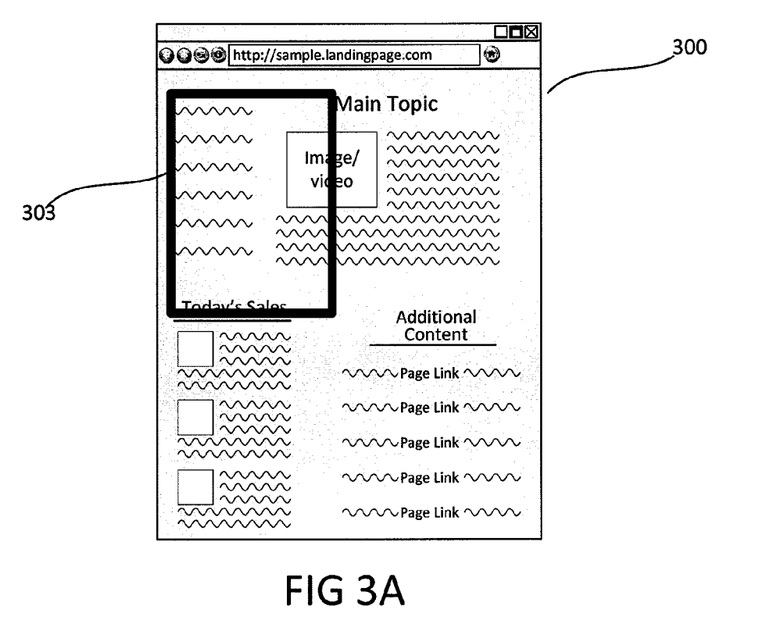
FIG. 3A is an exemplary illustration of a landing page optimizing tool interface.

According to an embodiment, the landing page optimizing tool can be set to allow the advertiser to manually set the predefined section of the landing page to be displayed. As illustrated in FIG. 3A, the landing page optimizing tool can display an image a selected landing page 300 with a block interface 303. The advertiser can move the block interface 303 around the landing page image to see the restricted display view of the landing page before setting the region/section which is to be displayed. The size of the block interface 303 can correspond to an average screen/display size from mobile devices or may vary depending on the class of mobile device selected by the advertiser, for example, smart phones, tablets and the like.

According to another exemplary embodiment, the advertiser can opt to have the defined region/section automatically selected based on landing page traffic analysis. For example, the most popular section of the landing page can be selected. In one instance, automatic landing page optimization is based on keywords associated with a corresponding creative. As discussed above, keywords can be assigned to a creative (ad) for serving purposes. These keywords can be utilized to optimize the landing page. For example, the keywords can be matched with the text in the landing page section, the section most relevant to the creative can be selected for display.

Figure 3B:
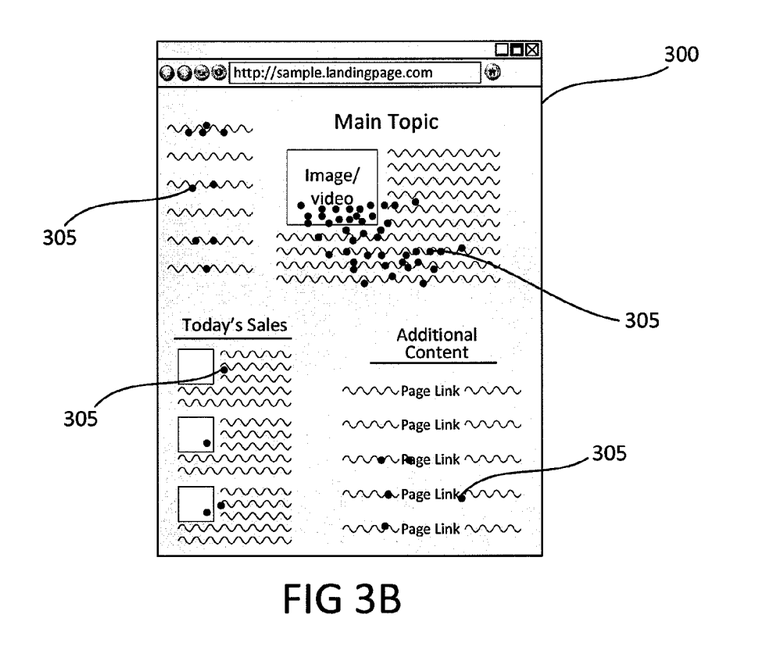
FIG. 3B is an exemplary illustration of a landing page heat map.
Figure 4:
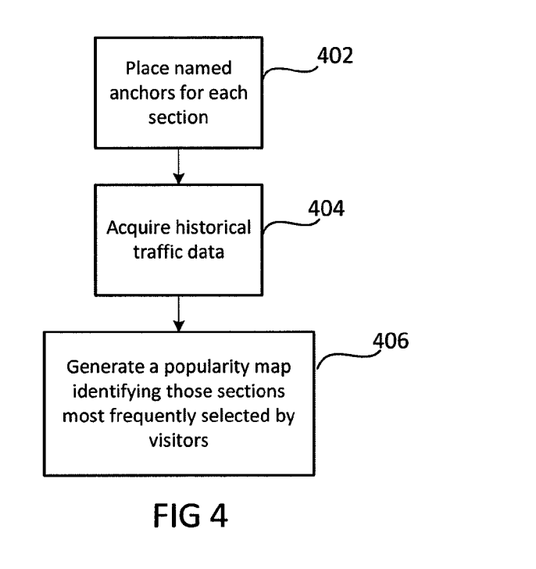
FIG. 4 is a flow diagram of an exemplary method for generating a landing page heat map.

In another instance, automatic landing page optimization is based in part on a popularity map of the landing page. The popularity or heat map provides a mapping between anchored sections of the landing the page and historical click data from visitors to the landing page. As illustrated in FIG. 4, heat map generation is a multi-step process. First, named anchors corresponding to each section are placed in the landing page (step 402). This can be done by the advertiser or page developer when the landing page is created and/or a tool may be provided to modify the code of an existing page to include the named anchors. Next, historical traffic data for the landing page is acquired (step 404). The historical traffic data can be obtained using a combination of code and first party cookies to log anonymous data about the visitors of the landing page. The code, for example a java script, is embedded in the landing page, such that it is executed during the presentation/display of the landing page. Finally, the landing page traffic data is utilized to generate a heat map for the landing page (step 406). The heat map provides a mapping of the anchored sections of the landing page most frequently selected/clicked by a visitor upon presentation. In some instances the heat map is provided to the advertiser. For example, the heat map can be presented to the advertiser graphical. As illustrated in the FIG. 3B, a screenshot of the landing page 300 is provided with a graphical representation 305 of the visitor clicks. The heat map provides the advertiser with useful information regarding the performance of the landing page and/or campaign.

In another instance, the advertiser can select a hybrid optimization mode wherein the advertiser allocates a certain percentage A of the traffic to manual mode and the remaining (1−A) percent of traffic is set to automatic mode. This allows the advertize to test new and/or different sections of the landing page while still allowing a percentage of the traffic is be automatically optimized based on user popularity.

Figure 5:
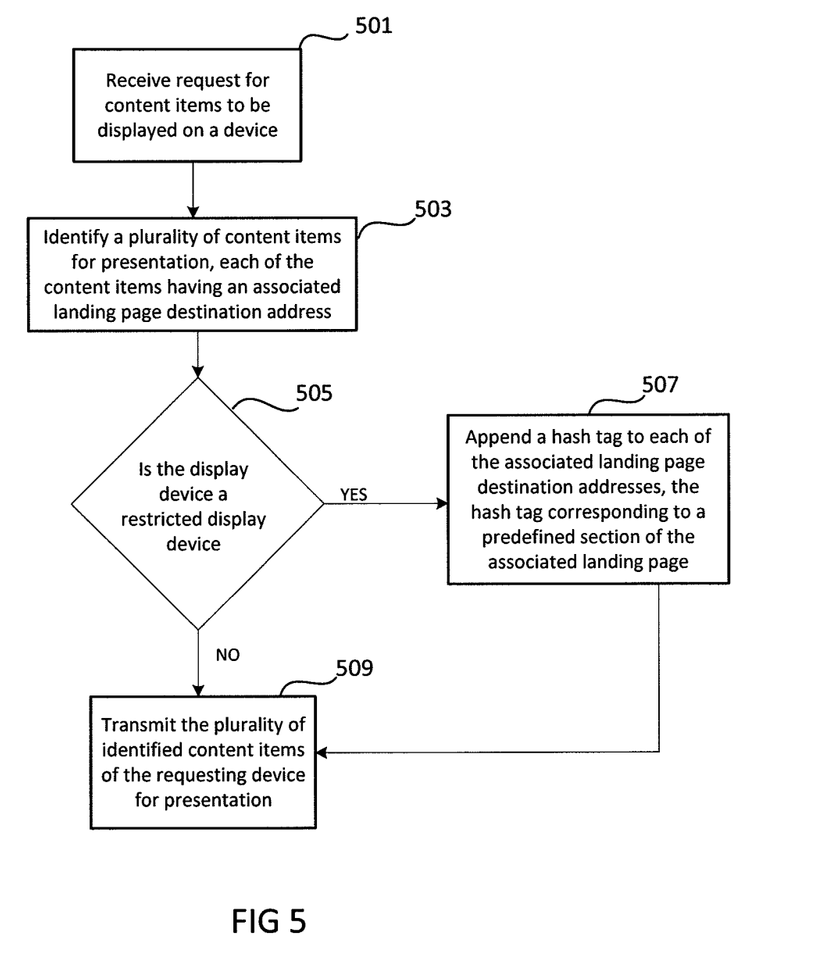
FIG. 5 is a flow diagram of an exemplary method for optimizing landing page presentation.

According to an exemplary embodiment illustrated in FIG. 5, landing page optimization is achieved by appending a hash tag, corresponding to a predetermined anchored section of the landing page, to the landing page's destination URL when a creative is transmitted for presentation. The exemplary process begins with receipt of a request for content items to be presented on a device, for example, a request for ads from a mobile phone (step 501). Next, a plurality of content items for presentation on the device are identified (step 503). The request can also include information regarding the device on which the content is to be displayed/presented. This device information can provide an indication of whether or not the requesting device is a restricted display device (step 505). A restricted display device is a device or application whose horizontal display area and/or resolution is not capable of displaying the landing page without inclusion of a horizontal scroll bar. In other words, the size of the display restricts presentation of the entire landing page without additional user interaction, for example, scrolling. Although the term display restricted "device" is used, an actual "device" is not required, as a restricted display device can correspond to an application with minimal display area. Accordingly, to an embodiment, any device with a display area les than a predetermined size can be considered a restricted display device. In addition, defined types or classes of devices, such as mobile phone or tablet computers, can be considered to be restricted display devices. As a result specific display size or resolution information is not necessarily needed to identify a device as a restricted display device.

If the display device is determined to be a display restricted device (yes branch at step 505), then a hash tag corresponding to a predetermined section of the landing page is appended to the landing page destination address associated with the content item (step 507). As discussed above, the predetermined section of the landing page to be displayed can be defined/selected by various methods. For example, it may be manual set by the content item provider, also known as an advertiser, it may be automatically selected based on a popularity map of the landing page, or a combination of the two. The determination of whether the requesting device is display restricted can be achieves in various ways. For example, the display related information can be included in the received request and/or device information may be used to determined display characteristics. Finally, the identified content items are transmitted to the requesting device for presentation. (Step 509).

Figure 6:
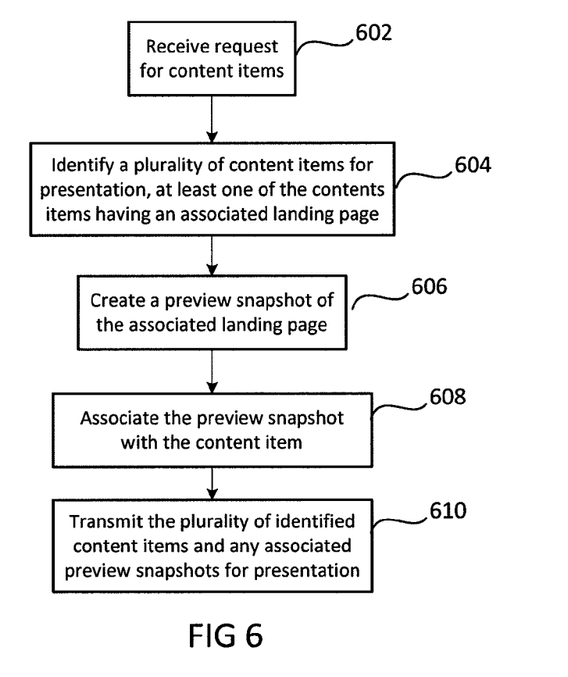
FIG. 6 is a flow diagram of an exemplary method for generating optimized landing page previews.

According to another embodiment, illustrated in FIG. 6, landing page previews can be optimized based on the landing page heat map. The exemplary process begins with receipt of a request for content items (step 602). Next, a plurality of content items for presentation on the requesting device are identified, where least one of the identified content items has an associated landing page (step 604). Based on the landing page's heat map, an optimized preview screenshot, i.e., image, of the landing page can be created (step 606). The optimized preview image is then associated with the corresponding content item (step 608) and the identified content items along with any optimized preview images are transmitted for presentation (step 610).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, although operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   providing, using one or more processors, a content provider with code to be embedded in a landing page, where sections of the landing page include named anchors;
   anonymously logging, using one or more processors, click activity from a plurality of visitors of the landing page using a combination of the embedded code and first party cookies;
   mapping, using one or more processors, the logged click data to the named anchored sections of the landing page, where the mapping indicates the anchored section corresponding to the first click of each visitor; and
   providing, using one or more processors, the content provider a visual representation of the mapping.

2. The method of claim 1, wherein the visual representation is a screenshot of the landing page with a visual indication of the historical click activity in the mapped section.

3. The method of claim 1, wherein the visual indication of the historical click activity is a graphical representation of the number of visitors first clicks received in each anchored section of the landing page.

4. A non-transitory computer readable medium, having stored thereon computer executable code that when executed causes one or more processors to perform the steps of:
   providing a content provider with code to be embedded in a landing page, where sections of the landing page include named anchors;
   anonymously logging click activity from a plurality of visitors of the landing page using a combination of the embedded code and first party cookies;
   mapping the logged click data to the named anchored sections of the landing page, where the mapping indicates the anchored section corresponding to the first click of each visitor; and
   providing the content provider a visual representation of the mapping.

5. The computer readable medium of claim 4, wherein the visual representation is a screenshot of the landing page with a visual indication of the historical click activity in the mapped section.

6. The computer readable medium of claim 4, wherein the visual indication of the historical click activity is a graphical representation of the number of visitor first clicks received in each anchored section of the landing page.

* * * * *